United States Patent [19]

Melander et al.

[11] E Re. 31,484

[45] Reissued Jan. 3, 1984

[54] ANTI-OXIDATION FLUID REPLENISHER CONTROL SYSTEM FOR PROCESSOR OF PHOTOSENSITIVE MATERIAL

[75] Inventors: Theodore A. Melander; Ralph L. Charnley, both of Minneapolis, Minn.

[73] Assignee: Pako Corporation, Minneapolis, Minn.

[21] Appl. No.: 234,388

[22] Filed: Feb. 13, 1981

Related U.S. Patent Documents

Reissue of:

[64] Patent No.: 4,174,169
Issued: Nov. 13, 1979
Appl. No.: 882,804
Filed: Mar. 2, 1978

[51] Int. Cl.[3] ..... G03D 3/06

[52] U.S. Cl. ..... 354/324; 137/624.15

[58] Field of Search ..... 354/297, 298, 324; 137/624.13, 624.15

[56] References Cited

U.S. PATENT DOCUMENTS

| | | | |
|---|---|---|---|
| 3,559,555 | 2/1971 | Street | 354/298 |
| 3,561,344 | 2/1971 | Frutiger et al. | 354/298 |
| 3,696,728 | 10/1972 | Hope | 354/298 |
| 3,752,052 | 8/1973 | Hope et al. | 354/297 X |
| 3,822,723 | 7/1974 | Crowell et al. | 354/297 X |
| 3,927,417 | 12/1975 | Kinoshita et al. | 354/298 |
| 4,057,818 | 11/1977 | Gaskell et al. | 354/298 |
| 4,104,670 | 8/1978 | Charnley et al. | 354/298 X |
| 4,119,952 | 10/1978 | Takahashi et al. | 354/298 X |

*Primary Examiner*—G. Z. Rubinson
*Assistant Examiner*—W. J. Brady
*Attorney, Agent, or Firm*—Kinney, Lange, Braddock, Westman and Fairbairn

[57] ABSTRACT

An automatic anti-oxidation fluid replenisher system for processors of photosensitive material has an improved, digital electronic control system. The control system includes a digital binary counter which is counted down if use-related chemical replenishment is not occurring in the processor, and is counted up (generally at a different rate) if use-related chemical replenishment is occurring in the processor. When the counter reaches a predetermined value (e.g. zero), a detection circuit triggers anti-oxidation replenishment and resets the counter to its original value for further operation. A special circuit protects against counter roll-over should the counter reach its maximum capacity due to frequent chemical replenishment activity.

31 Claims, 5 Drawing Figures

48
48a
48b
COUNT-UP
COUNT-DN
42
110
104
108
106
98
88
100
FROM FF 52 Q OUTPUT
FROM POWER-ON RESET
112
116
114
R8
ELAP-SED
S3 NON-USE
62
64
102
68
66
R7
C2
R6
44
OSC.
60
GATING SIGNAL
COUNT-UP FREQUENCY

ANTI-OXIDATION FLUID REPLENISHER CONTROL SYSTEM FOR PROCESSOR OF PHOTOSENSITIVE MATERIAL

Matter enclosed in heavy brackets [ ] appears in the original patent but forms no part of this reissue specification; matter printed in italics indicates the additions made by reissue.

BACKGROUND OF THE INVENTION

The present invention relates to replenisher systems in processors of photosensitive material. In particular, the present invention relates to an improved control system which is particularly useful in providing appropriate amounts of anti-oxidation (A-O) replenishment.

It is well known that photographic processors require replenishment of the processing fluids to compensate for changes in the chemical activity of the fluids. First, it has been recognized that replenishment is necessary to replace constituents used as photosensitive film or paper is developed in the processor. This replenishment is "use-related" or "exhaustion" chemical replenishment. Second, some replenishment systems have provided additional replenishment of an "anti-oxidation" (A-O) replenishment solution which counteracts the deterioration in chemical activity of the processor fluids due to aerial oxidation, which occurs with the passage of time regardless of whether film or paper is being processed.

Replenishment systems where originally manually operated. The operator would visually inspect the film being processed and would manually operate a replenisher system as he deemed necessary. The accuracy of manual replenisher systems is obviously dependent upon the skill and experience of the operator.

Various automatic chemical replenishment systems have been developed for providing "use-related" replenishment. Examples of these automatic replenishment systems include U.S. Pat. Nos. 3,592,539 by Schumacher; 3,559,555 by Street; 3,561,344 by Frutiger; 3,696,728 by Hope; 3,752,052 by Hope et al; 3,927,417 by Kinoshita et al; 4,057,818 by Gaskell et al; and a 4,104,670 by Charnley and Kumpula, which is assigned to the same assignee as the present application.

An example of a prior art replenisher control for providing both use-related and anti-oxidation replenishment is shown in U.S. Pat. No. 3,822,723 by Crowell et al. This patent shows the coordination of use-related and anti-oxidation replenishment by means of an electro-mechanical control system. The Crowell et al system, with its use of analog electronics and electromechanical cams, is generally difficult to calibrate, subject to drift problems, and is relatively limited in the number of control options available to the user. There is a continuing need for simpler, more reliable automatic replenisher systems which provide accurate anti-oxidation replenishment.

SUMMARY OF THE INVENTION

The present invention provides a digital electronic control system for controlling anti-oxidation replenishment in a processor of photosensitive material. The control system includes count decision means which is responsive to whether or not use-related chemical replenishment is occurring within the processor. The count decision means provides a first signal when use-related chemical replenishment is not occurring in the processor and a second signal when the chemical replenishment is occurring in the processor. Counter means, which is coupled to the count decision means, counts in one direction in value in response to the first signal and in an opposite direction in response to the second signal. Detection means detects the occurrence of a second predetermined value in the counter means and initiates anti-oxidation replenishment when that condition occurs.

DETAILED DESCRIPTION OF THE PREFERRED EMBODIMENTS

Anti-oxidation replenishment in a processor of photosensitive material, unlike use-related chemical replenishment, is dependent not only upon the amount of film or paper being processed but also upon the passage of time. The purpose of anti-oxidation replenishment is to replenish the processor solution to counteract deterioration caused by aerial oxidation (which occurs even when the processor is idle). In a processor that is being heavily utilized, and therefore is receiving frequent use-related chemical replenishment, the need for anti-oxidation replenishment is greatly reduced and indeed may be substantially eliminated. However, if the usage of the processor drops such that the use-related chemical replenishment occurs infrequently, periodic anti-oxidation replenishment is required.

Figure 1:
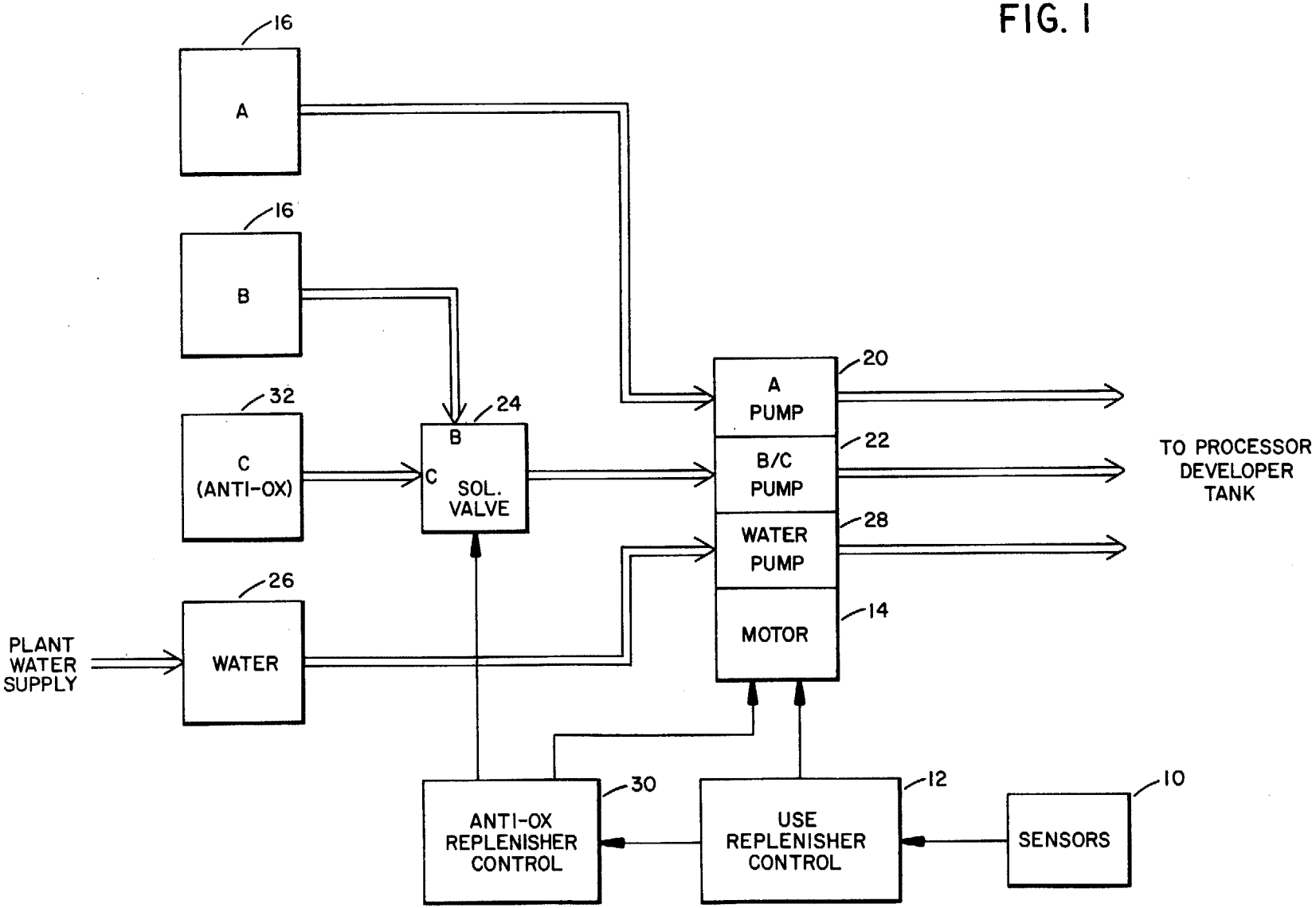
FIG. 1 is a block diagram of a photographic processor utilizing anti-oxidation replenishment.

FIG. 1 illustrates a general block diagram of a replenishment control system for a processor of photosensitive material. Sensors 10 senses parameters (such as film density, speed, and width) which are related to the need for use-related chemical replenishment. The output of sensors 10 is supplied to use replenisher control system 12, which controls replenishment motor 14.

The "A" and "B" replenisher solutions supplied during use-related replenishment are stored in concentrated form in reservoirs 16 and 18, respectively. The A solution is fed directly from reservoir 16 into the A pump 20, which is activated directly from replenishment motor 14. The B solution is fed to B/C pump 22 through solenoid valve 24. During use-related replenishment, solenoid valve 24 selects the B solution from reservoir 18 and supplies it directly to B/C pump 22, which also is activated directly from replenishment motor 14.

When use-related replenishment is initiated by the user replenisher control 12, the A solution from reservoir 16, the B solution from reservoir 18, and water from reservoir 26 are supplied by pumps 20, 22, and 28, respectively, to the developer tank of the processor.

Anti-oxidation replenisher control 30 determines when anti-oxidation replenishment is required, based upon time elapsed and upon the amount of use-related replenishment which has occurred (as indicated by a gating signal from use replenisher control 12). When anti-oxidation replenisher control 30 determines that anti-oxidation replenishment is required, it activates solenoid valve 24 so that C solution (which is the anti-oxidant) from reservoir 32 is supplied to B/C pump 22 instead of the B solution. In addition, anti-oxidation replenisher control 30 activates the replenishment motor 14, which drives A pump 20, B/C pump 22, and water pump 28 to supply the A and C solutions and water to the developer tank of the processor.

The system illustrated in FIG. 1, of course, is merely one embodiment in which the anti-oxidation replenisher control system of the present invention may be utilized. In one preferred embodiment, anti-oxidation replenisher control 30 initiates anti-oxidation replenishment approximately every 30 minutes if no use-related replenishment occurred during that time. If use-related replenishment did occur within the 30 minutes, the time period between anti-oxidation replenishment is increased. The amount of this increase is, of course, dependent upon the characteristics of the A, B, and C solutions.

Figure 2:
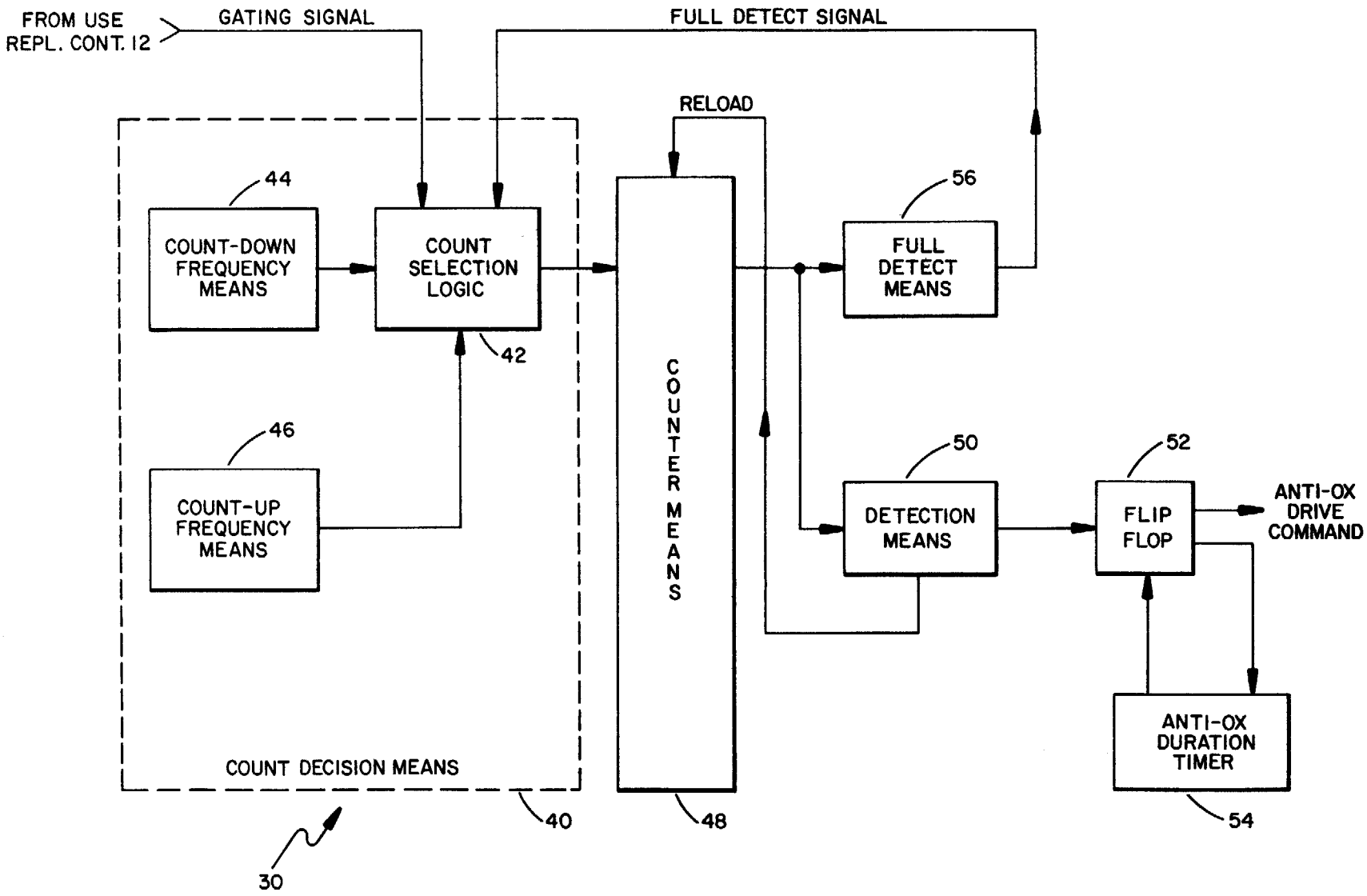
FIG. 2 is a general block diagram of the anti-oxidation replenishment control system of the present invention.

FIG. 2 is a general block diagram of the anti-oxidation replenisher control of the present invention. In FIG. 2, the use-related replenishment gating signal is received by count decision means 40 from use replenishment control 12. This gating signal is active when use-related replenishment is occurring and is inactive when use-related replenishment is not occurring. In the embodiment shown in FIG. 2, count decision means 40 includes count selection logic 42, count down frequency means 44, and count up frequency means 46. Count selection logic 42 receives the gating signal and determines whether a count down signal or a count up signal is sent to counter means 48. Counter means 48 has previously been loaded with a predetermined value (which in one preferred embodiment is a positive integer).

Count down frequency means 44 supplies the count down signal, a series of periodic signals having a frequency which determines the rate at which the value contained in count means 48 is to be decreased. Similarly, count up frequency means 46 supplies the count up signal, a series of periodic signals having a frequency which determines the rate at which the value in count means 48 is to be increased.

Count decision logic 42 selects the count down signal whenever the gating signal is inactive (i.e. when use-related replenishment is not occurring). Conversely, count decision logic 42 selects the count up signal whenever the gating signal is active (i.e. when use-related replenishment is occurring). Thus the frequency of the count down signal determines the rate at which anti-oxidation replenishment occurs in the absence of use-related replenishment, and the frequency of the count up signal determines the rate at which the time between anti-oxidation replenishment will be lengthened as a result of use-related replenishment.

Counter means 48 counts down (i.e. is decremented) whenever use-related replenishment is not occurring, and is counted up (i.e. incremented) whenever use-related replenishment is occurring. When the value in counter means 48 reaches a second predetermined value, detection means 50 signals flipflop 52, which in turn initiates anti-oxidation replenishment. Anti-oxidation duration timer 54 resets flipflop 52 after a predetermined period of time, thereby terminating the anti-ox drive command. Anti-oxidation duration timer 54, therefore, determines the length of time that anti-oxidation replenishment occurs after it has been initiated and correspondingly the amount or volume of anti-oxidation fluid which is supplied to the developer tank of the processor.

In addition, detection means 50 also supplies a signal back to counter means 48 which reloads counter means 48 with its initial, first predetermined value. This allows for the anti-oxidation replenishment control system to reset itself and continue in continuous operation.

In one preferred embodiment of the present invention, the second predetermined value which the detection means 50 detects is zero. In such a case, there is a danger that counter means 48 could "roll over" from its maximum value to zero and thus falsely trigger detection means 50. This danger exists if use-related replenishment is occurring very frequently, so that the value contained in counter means 48 increases to the maximum capacity of counter means 48. In order to prevent the roll over problem, full detect means 56 detects when counter means 48 has reached its maximum value and supplies a signal back to count selection logic 42 which allows the count decision logic 42 to supply only the count down signal from the count down frequency means 46 as long as count means 44 remains full. Thus the anti-oxidation replenishment control does not falsely trigger anti-oxidation replenishment when the maximum time between anti-oxidation replenishment is reached.

Figure 3:
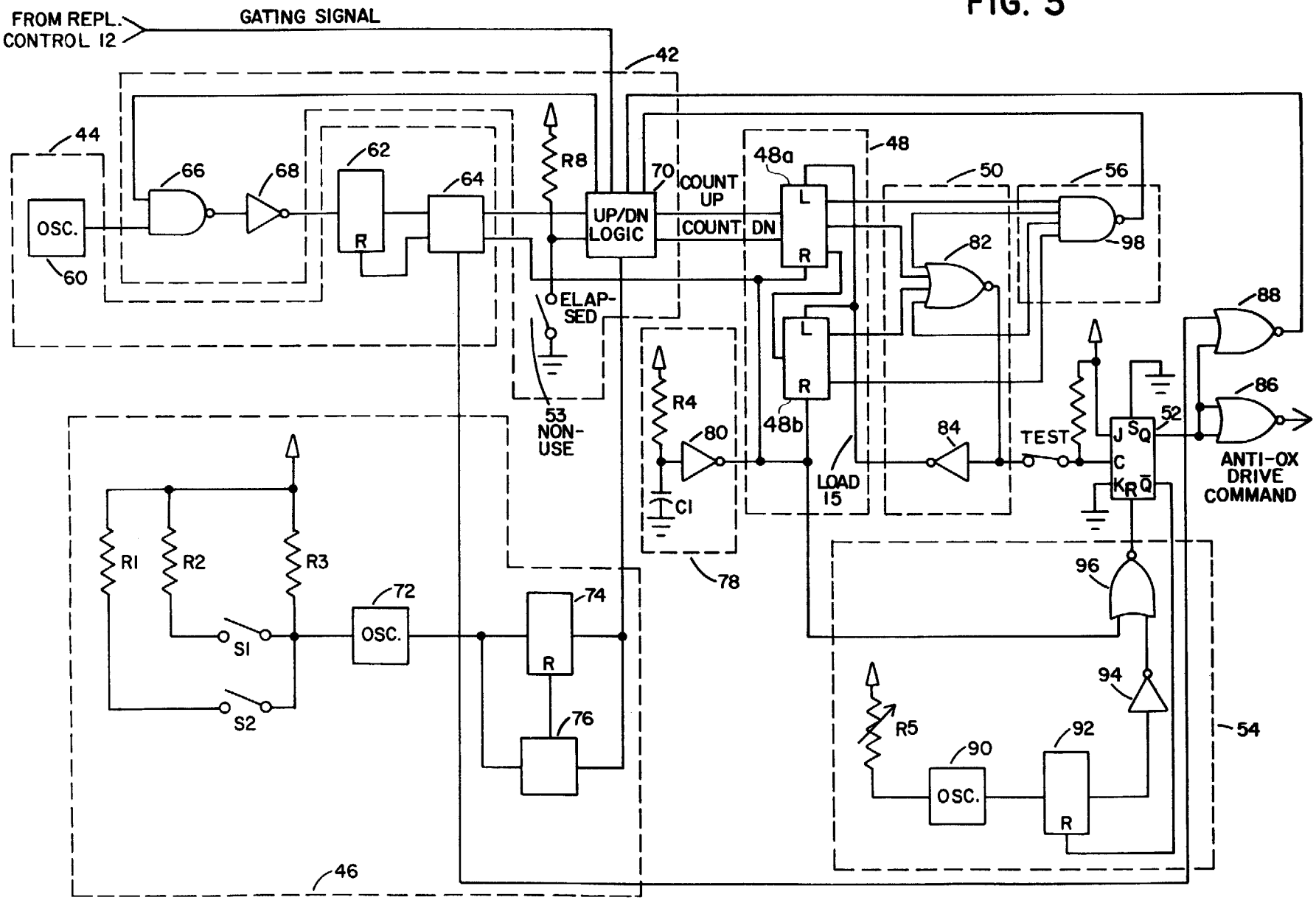
FIG. 3 is a detailed diagram of the anti-oxidation replenishment control system of the present invention.

FIG. 3 shows a detailed diagram of a preferred embodiment of the anti-oxidation replenishment control system of the present invention. Count down frequency means 44 includes oscillator 60, divider 62, and pulse shaping logic 64. The output of the oscillator 60 is supplied (through NAND gate 66 and inverter 68 of count selection logic 42) to divider 62, where it is digitally divided. Pulse shaping logic 64 receives the output of divider 62 and supplies the count down frequency signal to up/down logic 70 of count selection logic 42.

The count up signal is provided by count up frequency means 46, which includes oscillator 72, divider 74, pulse shaping logic 76, resistors R1, R2, and R3, and chemistry select switches S1 and S2. The position of select switches S1 or S2 sets oscillator 72 to one of three frequencies. Each frequency is used in conjunction with a particular replenisher chemistry.

Depending upon the state of the gating signal, count decision logic 42 supplies counter means 48 either the count down signal or the count up signal. In FIG. 3, counter means 48 is formed by two up/down binary counters, 48a and 48b. The two counters are illustrated merely for the purpose of demonstrating that a series of counters may be connected in cascade to provide a capacity for holding a larger count value. The two binary counters 48a and 48b are, of course, connected with carry and borrow signals between stages. Counters 48a and 48b are supplied with a reset signal from a power on reset circuit 78 consisting of resistor R4, capacitor C1, and inverter 80. Power on reset circuit 78 resets binary counters 48a and 48b to an initial value upon power up.

The outputs of counters 48a and 48b are connected to detection means 50, which includes NOR circuit 82 and inverter 84. A logical zero in binary counters 48a and 48b is detected by NOR circuit 82. When all outputs of counters 48a and 48b are low (indicating a zero value in binary counters 48a and 48b), the output of NOR circuit 82 goes high indicating a zero detection.

The zero detection signal from NOR circuit 82 is fed to the clock input of flipflop 52. The Q output of flipflop 52 is supplied through NOR circuit 86 as a command signal which controls anti-oxidation replenishment. The Q output of flipflop 52 is supplied to NOR circuits 86 and 88. NOR circuit 86 supplies a command signal which controls anti-oxidation replenishment. NOR circuit 88 provides a signal to up/down logic 70 to lock out the up-counting that normally takes place when the replenishment pump runs. This is to prevent anti-oxidation pumping from being erroneously recognized as exhaustion replenishment. NOR gate 88 is also controlled by pulse-shaping logic 64 to prevent a count up attempt during the short-duration count down pulse.

With flipflop 52 set, the $\overline{Q}$ output goes low, thereby activating the anti-oxidation duration timer 54. In FIG. 3, anti-oxidation duration timer 54 includes variable resistor R5, variable oscillator 90, divider 92; with inverter 94 and NAND circuit 96 allowing power on reset. Anti-oxidation duration timer 54 provides a monostable reset signal to the Reset input of flipflop 52 to reset flipflop 52 (and thereby terminate anti-oxidation replenishment) after a predetermined time duration. This time duration (which is determined by the operator by setting variable resistor R5) differs for different anti-oxidation replenisher volumes and dispensing rates.

Inverter 84 is also activated from the zero detection signal from NOR circuit 82. Inverter 84 drives the load inputs of binary counters 48a and 48b. Thus when NOR circuit 82 detects a zero condition in binary counters 48a and 48b, inverter 84 automatically causes binary counters 48a and 48b to be loaded with the first predetermined value.

Full detect means 56 comprises NAND circuit 98, which is also connected to the outputs of binary counters 48a and 48b. The output of NAND circuit 98 is the full detect signal, which is active (low) whenever all of its inputs are high, indicating that binary counters 48a and 48b have reached an all "1's" condition, the maximum binary value capable of being held in counters 48a and 48b. Upon receiving the full detect signal, up/down logic 70 is inhibited from supplying the count up signal to binary counters 48a and 48b, even if the gating signal is active. In this condition binary counters 48a and 48b merely hold the "full" value until the gating signal is inactive and the count down signal begins to be supplied by up/down logic 70. In this manner, "roll over" of counters 48a and 48b is prevented.

Figure 4:
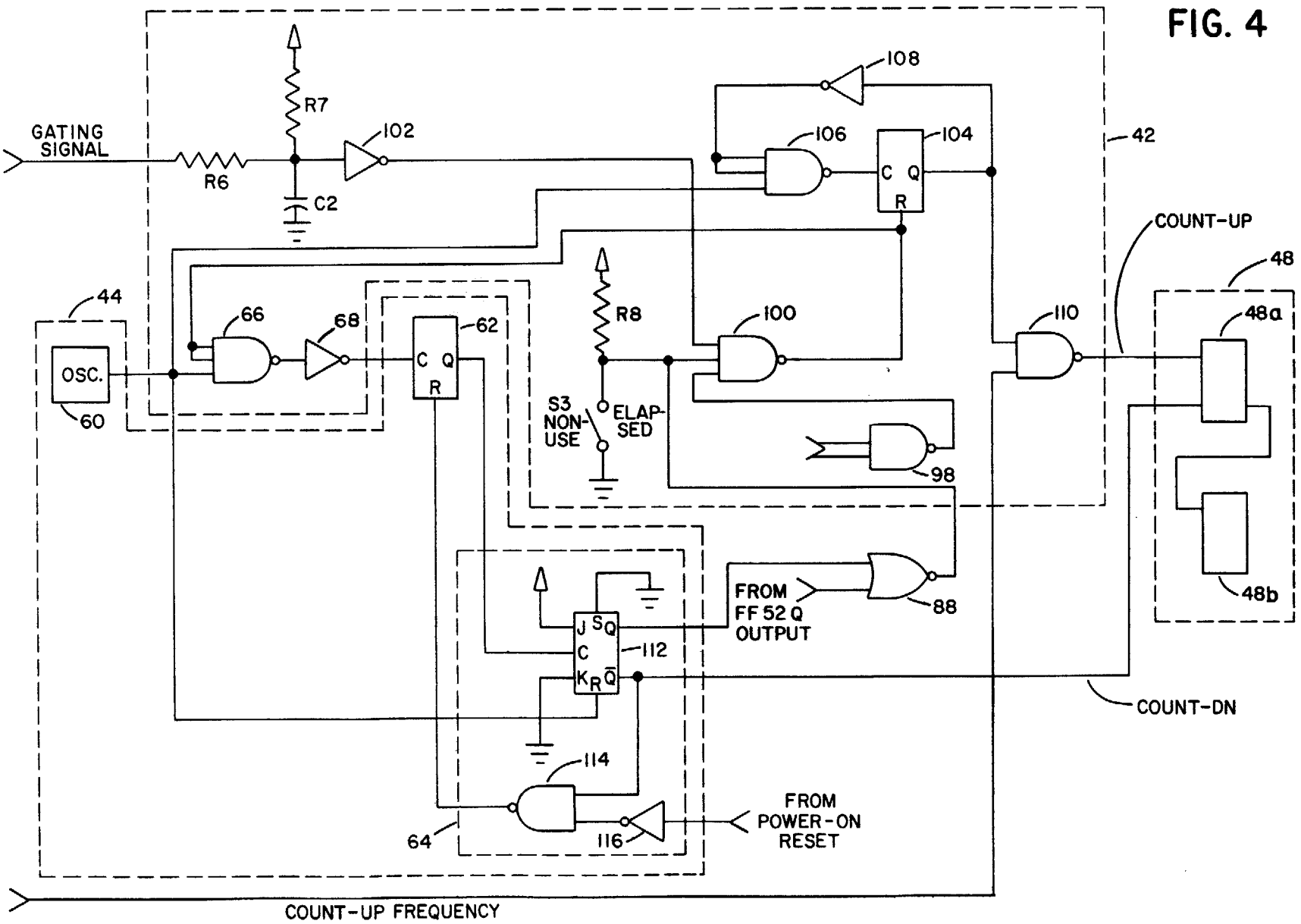
FIG. 4 is a detailed diagram of the count up/down selection circuit.

FIG. 4 shows a preferred embodiment of count decision logic 42. For purposes of illustration and discussion, count down frequency means 44, counters 48a and 48b, NOR circuit 88, and NAND circuit 98 are also shown.

The count decision logic 42 presents either a count up or a count down signal to counters 48a and 48b, and is controlled by the gating signal. However, the count up function is blocked for the duration of the count down frequency pulse, during anti-ox pumping time, or by S3, the elapsed or non-use selection switch. NAND circuit 100 is the central control element.

The gating signal is conditioned by R6, R7, and C2, and passes through inverter circuit 102, whose output is active high. If the other two inputs of NAND circuit 100 are also high, its output goes low. This low output acts on NAND circuit 66 to block oscillator 60 output from reaching divider 62 and thus stops the count down frequency. The output low of 100 also removes the reset from counter 104 which allows oscillator 60 to increment counter 104 through NAND circuit 106. When the count reaches the Q output which is active high, this signal acts through inverter circuit 108 on NAND gate 106 to block the count up frequency. Counter 104 then maintains a high output at Q which acts on NAND circuit 110 and allows the count up frequency to pass through to increment counters 48a and 48b.

S3 and R8 allow selection of up/down (non-use) counting or down counting only (elapsed time). With S3 closed, a low is maintained and up-counting is blocked. Full-count detect 98 acts in a like manner, as does NOR circuit 88. NOR circuit 88 is controlled either by a pump run command (i.e. the Q output of flipflop 52) or by presence of a down-count pulse from flipflop 112 Q output.

Flipflop 112, along with NAND circuit 114 and inverter 116, constitute pulse-shaping logic 64. When the Q output of divider 62 goes active high, this clocks flipflop 112 such that Q goes active high and $\overline{Q}$ goes active low. The $\overline{Q}$ output signal acts through NAND circuit 114 to reset divider 62 to start a new count sequence. The oscillator 60 signal than acts to reset flipflop 112, which limits the pulse width to 50 microseconds. At power on, divider 62 is reset to zero by the power on reset acting through inverter circuit 116 and NAND circuit 114.

Figure 5:
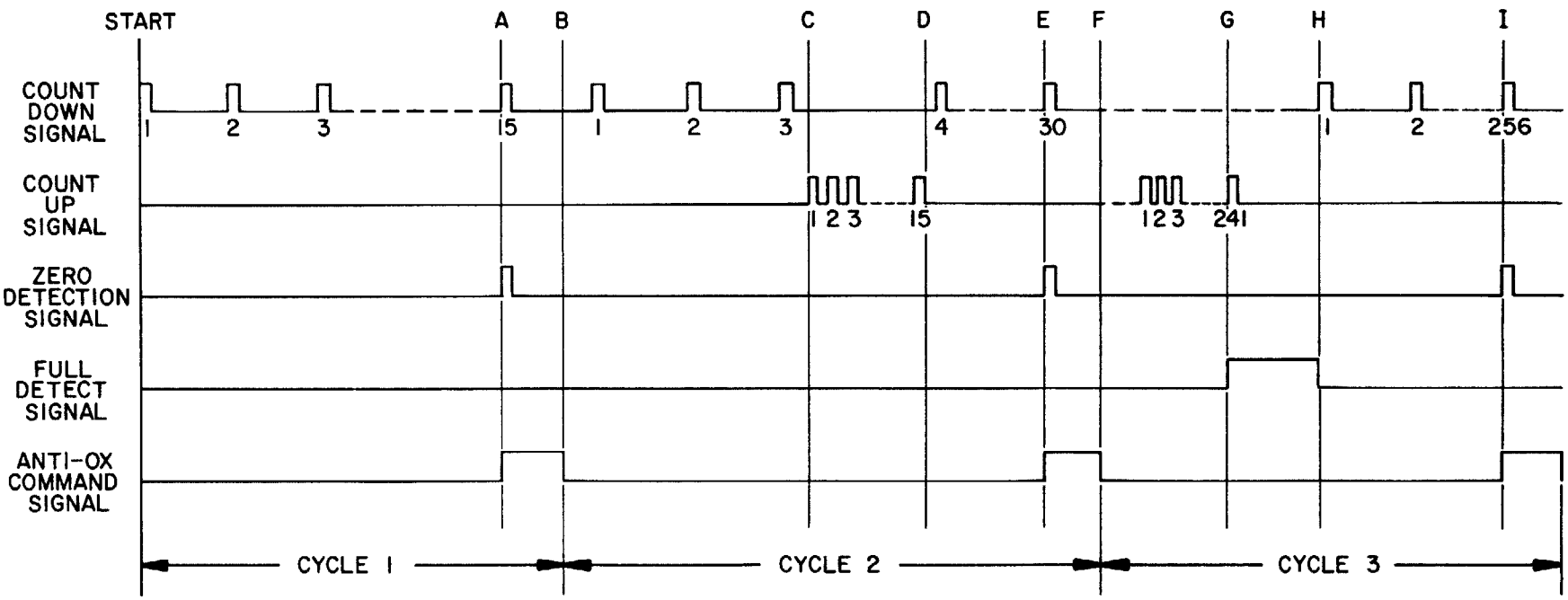
FIG. 5 is a timing diagram of representative signals from the detailed diagram of FIG. 3.

Understanding the operation of the detailed circuitry described in FIGS. 3 and 4, may be better facilitated by reference to the timing diagram of FIG. 5. In FIG. 5 are illustrated typical count down, count up, zero detection, full detect and anti-ox command signals during three different possible cycles.

The count down signal determines the rate at which the value in binary counters 48a and 48b is counted down. In one preferred embodiment, the rate or frequency of the signals is such that the value contained in the binary counters will be counted down from its initial predetermined value of 15 to zero in 30 minutes.

Similarly, the count up frequency signal determines the rate at which the value in counters 48a and 48b is counted up during the time when the gating signal is active. As illustrated in FIG. 5, the frequency of the count up signal is much greater than the frequency of the count down signal. The count up frequency is adjustable so that the resulting increase in time required to count down to zero corresponds to the delayed time recommended for the particular replenisher chemistry being used.

The zero detection signal is the output of NOR circuit 82 in FIG. 3, and represents a "zero" condition in binary counters 48a and 48b. When the zero detection signal is active, it causes initiation of anti-oxidation replenishment and reloading of counters 48a and 48b.

The full detect signal is the output from NAND gate 98 in FIG. 3. This signal, which indicates that binary counters 48a and 48b have reached their maximum value, is fed back to count decision logic 42 to prevent further counting up of binary counters 48a and 48b. The full detect signal remains high until a count down pulse is received.

The anti-oxidation command signal is the Q output from flipflop 52 in FIG. 3. In the timing chart, the anti-oxidation command signal is initiated when the zero detection signal goes high. The anti-oxidation command signal is active for a finite period of time (determined by anti-oxidation duration timer 54) and then is reset to an inactive state. The length of time that the anti-oxidation command signal is active determines the amount of time that motor 14 (FIG. 1) runs.

In Cycle 1, no use-related replenishment has occurred from "START" to point A in the timing chart. This yields the minimum interval between anti-oxidation replenishment because during this time only the count down signal is supplied to binary counters 48a and 48b. Assuming the initial value of 15 in binary counters 48a and 48b, the counters will reach zero after 15 count down signal pulses, since the counters are decremented by one digit upon each and every pulse. This occurs at point A. The zero detection signal is activated and initiates the anti-oxidation command signal which is active for a finite period of time (until point B) which time period is determined by anti-oxidation duration timer 54. As soon as the zero detect signal is activated, binary counters 48a and 48b are reloaded with the value of 15, and the zero detection signal is deactivated. The count down signal again begins decrementing counters 48a and 48b.

Cycle 2 illustrates a situation in which use-related chemical replenishment does occur (between points C and D). During the time interval between points C and D, the count up signal is supplied to binary counters 48a and 48b. As illustrated in FIG. 5, 15 of these count up signal pulses are received before use-related replenishment ceases. As a result, the value in binary counters 48a and 48b is increased by 15, so that a total of 30 count down signal pulses between points A and E are required to decrement counters 48a and 48b to zero. When the count in binary counters 48a and 48b again reaches zero, the zero detection signal is activated, thereby initiating the anti-oxidation command signal and again reloading counters 48a and 48b in a value of 15. The anti-oxidation command signal is active until point F.

Cycle 3 illustrates the situation in which use-related replenishment is occurring within the processor at such frequency that counters 48a and 48b reach their maximum value of 256. With an initial count of 15 in counters 48a and 48b just after point E, a total of 241 count up signal pulses are illustrated. These pulses bring the value in counters 48a and 48b to a full maximum count of 256 at point G. At this time, the full detect signal is activated, which prevents further incrementing of counters 48a and 48b from point G to point H (when a count down signal pulse decrements the count). From point H to point I, use-related replenishment is not occurring within the processor. During this time, a total of 256 count down signal pulses are required to reduce the full count of 256 in the binary counters to zero. At point I, the zero detection signal again is activated, which initiates another anti-oxidation replenishment.

Although the timing chart in FIG. 5 assumes an initial count of 15 in the binary counters and a final count of zero, it is understood that other values may be used. Similarly, although for simplicity the situations illustrated in Cycles 2 and 3 have involved a single time period in which count up signal pulses are provided, it is clear that the count up signal can occur several times in a cycle depending upon how frequently use-related replenishment is occurring.

In conclusion, the present invention is a novel control system which is particularly useful in controlling anti-oxidation replenishment within a processor of photosensitive material. It is to be understood, however, that various changes, modifications, and substitutions in the form or the details can be made without departing from the scope of the invention as defined by the following claims.

What is claimed is:

1. A control system for controlling anti-oxidation replenisher means to provide anti-oxidation fluid to a processor of photosensitive material, the control system comprising:

count decision means responsive to whether use-related chemical replenishment is occurring within the processor for providing a first signal when use-related chemical replenishment is not occurring and a second signal when use-related chemical replenishment is occurring;

counter means operatively coupled to the count decision means for holding a first predetermined value and for counting in one direction in value whenever the count decision means provides the first signal and for counting in the opposite direction in value whenever the count decision means provides the second signal; and detection means operatively coupled to the counter means for detecting the occurrence of a second predetermined value in the counter means and for causing the anti-oxidation replenisher means to initiate anti-oxidation fluid replenishment.

2. The control system of claim 1 and further comprising:

reset means operatively coupled to the detection means and to the counter means for resetting the counter means to the first predetermined value whenever the detection means detects the second predetermined value in the counter means.

3. The control system of claim 2 and further comprising:

full detect means operatively coupled to the counter means and to the count decision means for detecting when the counter means has reached its capacity in value and providing a full signal to the count decision means to inhibit the providing of the second signal.

4. The control system of claim 1 wherein the counter means comprises a multistate digital counter.

5. The control system of claim 4 wherein the first predetermined value is a positive integer.

6. The control system of claim 5 wherein the second predetermined value is zero.

7. The control system of claim 6 wherein the multistage digital counter counts in a decrementing direction whenever the count decision means provides the first signal and counts in an incrementing direction whenever the count decision means provides the second signal.

8. The control system of claim 1 wherein the count decision means comprises:

down frequency means for providing a down periodic timing signal at a first predetermined frequency;

up frequency means for providing an up periodic timing signal at a second predetermined frequency; and selection means coupled to the down frequency means and the up frequency means for selecting the down periodic timing signal as the first signal and for selecting the up periodic timing signal as the second signal.

9. The control system of claim 8 and further comprising:

reset means operatively coupled to the detection means and to the counter means for resetting the counter means to the first predetermined value whenever the detection means detects the second predetermined value in the counter means.

10. The control system as in claim 9 and further comprising:

full detect means operatively coupled to the counter means and to the selection means for detecting when the counter means has reached its capacity in value and providing a full signal to the selection means to inhibit the providing of the second signal.

11. In a processor of photosensitive material of the type having both use-related chemical replenishment and anti-oxidation chemical replenishment, a control system for controlling anti-oxidation replenisher means to provide anti-oxidation fluid to the processor, the control system comprising:

down frequency means for providing a down periodic timing signal at a first predetermined frequency;

up frequency means for providing an up periodic timing signal at a second predetermined frequency;

selection means coupled to the down frequency means, coupled to the up frequency means and responsive to whether use-related chemical replenishment is occurring within the processor for selecting the down periodic timing signal when use-related chemical replenishment is not occurring and for selecting the up periodic timing signal when use-related chemical replenishment is occurring;

counter means operatively coupled to the selection means for holding a first predetermined value and counting down in value whenever the selection means selects the down periodic timing signal and for counting up in value whenever the selection means selects the up periodic timing signal;

detection means operatively coupled to the counter means for detecting the occurrence of a second predetermined value in the counter means; and initiate means operatively coupled to the detection means for initiating anti-oxidation fluid replenishment when the detection means detects the second predetermined value in the counter means.

12. The control system of claim 11 and further comprising:

reset means operatively coupled to the detection means and to the counter means for resetting the counter means to the first predetermined value whenever the detection means detects the second predetermined value in the counter means.

13. The control system as in claim 12 and further comprising:

full detect means operatively coupled to the counter means and to the count decision means for detecting when the counter means has reached its maximum capacity in value and for providing a full detect signal to the selection means to inhibit the selection means from selecting the up periodic timing signal.

14. The control system of claim 13 wherein the initiate means comprises:

flipflop means coupled to the detection means for switching to a first state upon the detection of the second predetermined value in the counter means; and duration timer means operatively coupled to the flipflop means for providing anti-oxidation replenishment for a predetermined period of time upon the flipflop means switching to the first state and for resetting the flipflop means to a second state at the end of the predetermined period of time.

15. A control system as in claim 13 wherein the first predetermined value is a positive integer.

16. A control system as in claim 14 wherein the second predetermined value is zero.

17. A control system for controlling replenisher means which provides replenisher fluid to a processor of photosensitive material, the control system comprising:

down frequency means for providing a count down signal;

up frequency means for providing a count up signal;

up/down counter means for counting in response to the count down signal or the count up signal;

up/down selection means for controlling, as a function of a signal related to need for replenishment, whether the up/down counter means counts in response to the count up signal or the count down signal;

detection means for providing a detection signal when the count of the up/down counter means reaches a predetermined count; and initiate means for initiating replenishment by the replenisher means in response to the detection signal.

18. The control system of claim 17 and further comprising:

load means for loading an initial count into the up/down counter means.

19. The control system of claim 18 wherein the load means loads the initial count in response to the detection signal.

20. The control system of claim 17 wherein the up/down selection means normally causes the up/down counter means to count in response to the count down signal and wherein the up/down selection means causes the up/down counter means to count in response to the count up signal in response to the signal related to need for replenishment.

21. The control system of claim 20 wherein the control system controls providing of anti-oxidation replenisher fluid by the replenisher means and wherein the signal related to need for replenishment is indicative of the occurrence of use-related replenishment within the processor.

22. The control system of claim 20 and further comprising:

full detect means for providing a full detect signal when the count in the up/down counter means reaches the maximum capacity of the up/down counter means.

23. The control system of claim 22 wherein the up/down selection means receives the full detect signal and prevents further up counting by the up/down counter means when the full detect signal is present.

24. The control system of claim 17 wherein the replenisher control means comprises:

flipflop means having a first state and a second state, the flipflop means switching to the first state in response to the detection signal; and duration timer means for providing a signal to the flipflop means which causes the flipflop means to switch from the first state to the second state a predetermined period of time after the flipflop means has switched to the first state.

25. The control system of claim 24 wherein the replenisher control means further comprises:

means for deriving a replenisher command signal to the replenisher means as a function of the state of the flipflop means.

26. The control system of claim 17 wherein the up frequency means includes;

means for selectively varying the frequency of the count up signal.

*27. In a processor of photosensitive material of the type having both use-related chemical replenishment and anti-oxidation chemical replenishment, a control system for controlling anti-oxidation replenisher means to provide anti-oxidation replenishment to the processor, the control system comprising:*

*means for providing a variable time interval between successive anti-oxidation replenishments and providing a signal to the anti-oxidation replenisher means at the end of the variable time interval to cause the anti-oxidation replenisher means to initiate anti-oxidation chemical replenishment; and*

*means for causing the means for providing a variable time interval to lengthen the time interval as a function of use-related replenishment provided during the time interval.*

*28. In a processor of photosensitive material of the type having use-related replenisher means for providing use-related chemical replenishment, anti-oxidation replenisher means for providing anti-oxidation chemical replenishment, a control system comprising:*

*sensor means for sensing parameters related to need for use-related chemical replenishment;*

*use-related replenisher control means for controlling the use-related replenisher means as a function of the sensed parameters to provide use-related chemical replenishment; and*

*anti-oxidation relenisher control means for controlling the anti-oxidation replenisher means to provide anti-oxidation chemical replenishment at variable time intervals, each variable time interval being a function of a predetermined minimum time interval and use-related chemical replenishment which occurs during the variable time interval.*

*29. A method for providing anti-oxidation chemical replenishment in a processor of photosensitive material, the method comprising:*

*providing a value representative of a time interval until anti-oxidation chemical replenishment;*

*changing the value to reduce the time interval as a function of time;*

*providing use-related chemical replenishment as a function of use of processor fluid;*

*changing the value to increase the time interval as a function of use-related replenishment provided during the time interval; and*

*providing anti-oxidation chemical replenishment when the time interval is ended.*

*30. A control system for controlling anti-oxidation replenishment in a processor of photosensitive material, the control system comprising:*

*means for providing a signal indicative of use-related replenishment provided in the processor;*

*means for providing a value representative of a time interval until anti-oxidation replenishment;*

*means for changing the value to reduce the time interval as a function of time;*

*means for changing the value to increase the time interval as a function of the signal indicative of use-related replenishment provided; and*

*means for initiating anti-oxidation replenishment at an end of the time interval.*

*31. In a processor of photosensitive material of the type having both use-related chemical replenishment and anti-oxidation chemical replenishment, a control system for controlling anti-oxidation replenishment comprising:*

*means for providing a first signal determinative of a time interval of predetermined length in an absence of use-related chemical replenishment;*

*means for providing a second signal determinative of an increase in the time interval as a result of use-related chemical replenishment during the time interval; and*

*means responsive to the first and second signals for providing anti-oxidation chemical replenishment at an end of the time interval.*

* * * * *